(12) United States Patent
Wiggins et al.

(10) Patent No.: US 7,689,345 B2
(45) Date of Patent: Mar. 30, 2010

(54) SYSTEMS AND METHODS FOR ESTIMATING RESIDUAL GAS FRACTION FOR INTERNAL COMBUSTION ENGINES USING ALTITUDE COMPENSATION

(75) Inventors: Layne K. Wiggins, Plymouth, MI (US); Jason Meyer, Dayton, OH (US); Yann G. Guezennec, Upper Arlington, OH (US)

(73) Assignee: GM Global Technology Operations, Inc.

( * ) Notice: Subject to any disclaimer, the term of this patent is extended or adjusted under 35 U.S.C. 154(b) by 263 days.

(21) Appl. No.: 11/965,057

(22) Filed: Dec. 27, 2007

(65) Prior Publication Data

US 2009/0076703 A1  Mar. 19, 2009

Related U.S. Application Data

(60) Provisional application No. 60/972,930, filed on Sep. 17, 2007.

(51) Int. Cl.
| | |
|---|---|
| *G06F 19/00* | (2006.01) |
| *F02M 25/07* | (2006.01) |
| *F02B 75/12* | (2006.01) |
| *G06F 17/10* | (2006.01) |

(52) U.S. Cl. .................. 701/103; 701/110; 702/182
(58) Field of Classification Search ... 123/90.15–90.18, 123/90.31, 316, 339.11, 339.14, 347, 348, 123/399, 403, 568.14; 701/101–105, 108, 701/110, 115; 702/182, 187; 73/114.25, 73/114.26
See application file for complete search history.

(56) References Cited

U.S. PATENT DOCUMENTS

| | | | | |
|---|---|---|---|---|
| 7,181,332 | B1 * | 2/2007 | Vick et al. | 701/103 |
| 7,292,928 | B2 * | 11/2007 | Vick et al. | 701/103 |
| 7,305,950 | B1 * | 12/2007 | Sinnamon | 123/90.17 |
| 7,464,676 | B2 * | 12/2008 | Wiggins et al. | 123/90.17 |
| 7,472,013 | B1 * | 12/2008 | Wiggins et al. | 701/102 |
| 2007/0265805 | A1 * | 11/2007 | Lee et al. | 702/187 |

* cited by examiner

*Primary Examiner*—Willis R Wolfe, Jr.
(74) *Attorney, Agent, or Firm*—Harness, Dickey & Pierce, P.L.C.

(57) ABSTRACT

An engine control system comprises a first factor calculating module that calculates a first factor based on intake cam position (ICAM), exhaust cam position (ECAM), engine speed (RPM) and first calibration factors. A second factor calculating module calculates a second factor based on ICAM, ECAM, RPM and second calibration factors. A residual gas fraction (RGF) estimating module estimates a RGF value based on the first factor adjusted for altitude and said second factor. A method comprises calculating a first factor based on intake cam position (ICAM), exhaust cam position (ECAM), engine speed (RPM) and first calibration factors; calculating a second factor based on ICAM, ECAM, RPM and second calibration factors; and estimating a residual gas fraction (RGF) value based on the first factor adjusted for altitude and said second factor. At least one engine operating parameter is adjusted based on the RGF value.

16 Claims, 10 Drawing Sheets

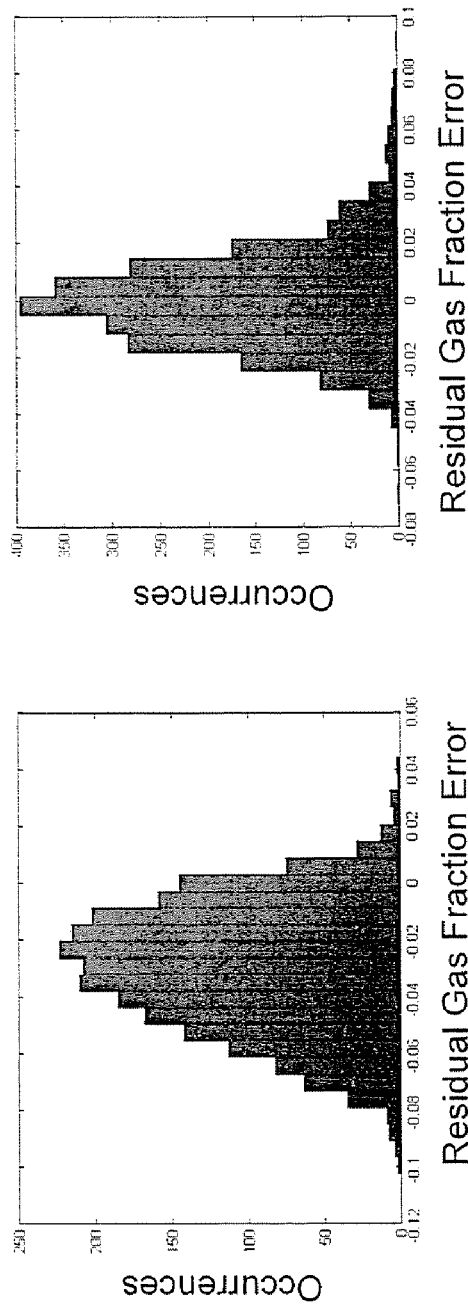
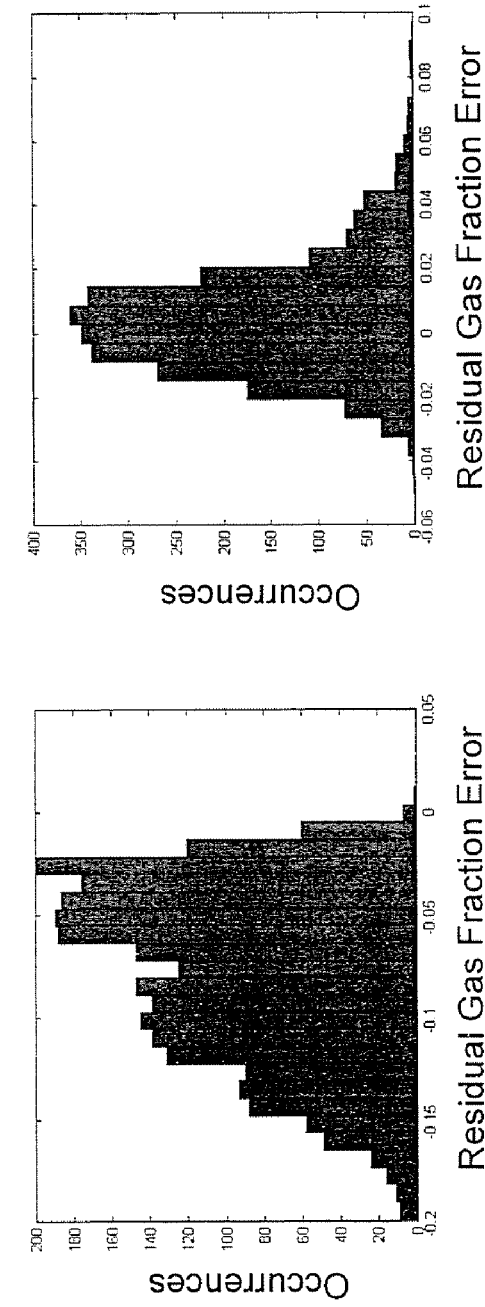
FIG. 9
FIG. 10
FIG. 11
FIG. 12

SYSTEMS AND METHODS FOR ESTIMATING RESIDUAL GAS FRACTION FOR INTERNAL COMBUSTION ENGINES USING ALTITUDE COMPENSATION

CROSS-REFERENCE TO RELATED APPLICATIONS

This application claims the benefit of U.S. Provisional Application No. 60/972,930, filed on Sep. 17, 2007. The disclosure of the above application is incorporated herein by reference in its entirety.

FIELD

The present disclosure relates to engine control systems for internal combustion engines, and more particularly to engine control systems that estimate residual gas.

BACKGROUND

The statements in this section merely provide background information related to the present disclosure and may not constitute prior art.

Residual gas is the burned air/fuel mixture that remains in a cylinder after a combustion event in a spark-ignited gasoline internal combustion engine. The amount of residual gas has a significant effect on emissions, performance, combustion stability, and volumetric efficiency.

Residual gas affects the combustion process in spark-ignition engines through its influence on charge mass, dilution, temperature and flame speed. These effects may be important for optimizing engine idle stability, fuel economy and $NO_x$ emission. Current residual gas estimation strategies are inaccurate and unable to adjust for different altitudes.

SUMMARY

An engine control system comprises a first factor calculating module that calculates a first factor based on intake cam position (ICAM), exhaust cam position (ECAM), engine speed (RPM) and first calibration factors. A second factor calculating module calculates a second factor based on ICAM, ECAM, RPM and second calibration factors. A residual gas fraction (RGF) estimating module estimates a RGF value based on the first factor adjusted for altitude and said second factor. An engine operating module adjusts at least one engine operating parameter based on the RGF value.

A method comprises calculating a first factor based on intake cam position (ICAM), exhaust cam position (ECAM), engine speed (RPM) and first calibration factors; calculating a second factor based on ICAM, ECAM, RPM and second calibration factors; and estimating a residual gas fraction (RGF) value based on the first factor adjusted for altitude and said second factor. At least one engine operating parameter is adjusted based on the RGF value.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 9-12 illustrate RGF error for two pressures both with and without barometric correction factors.

DETAILED DESCRIPTION

Figure 1:
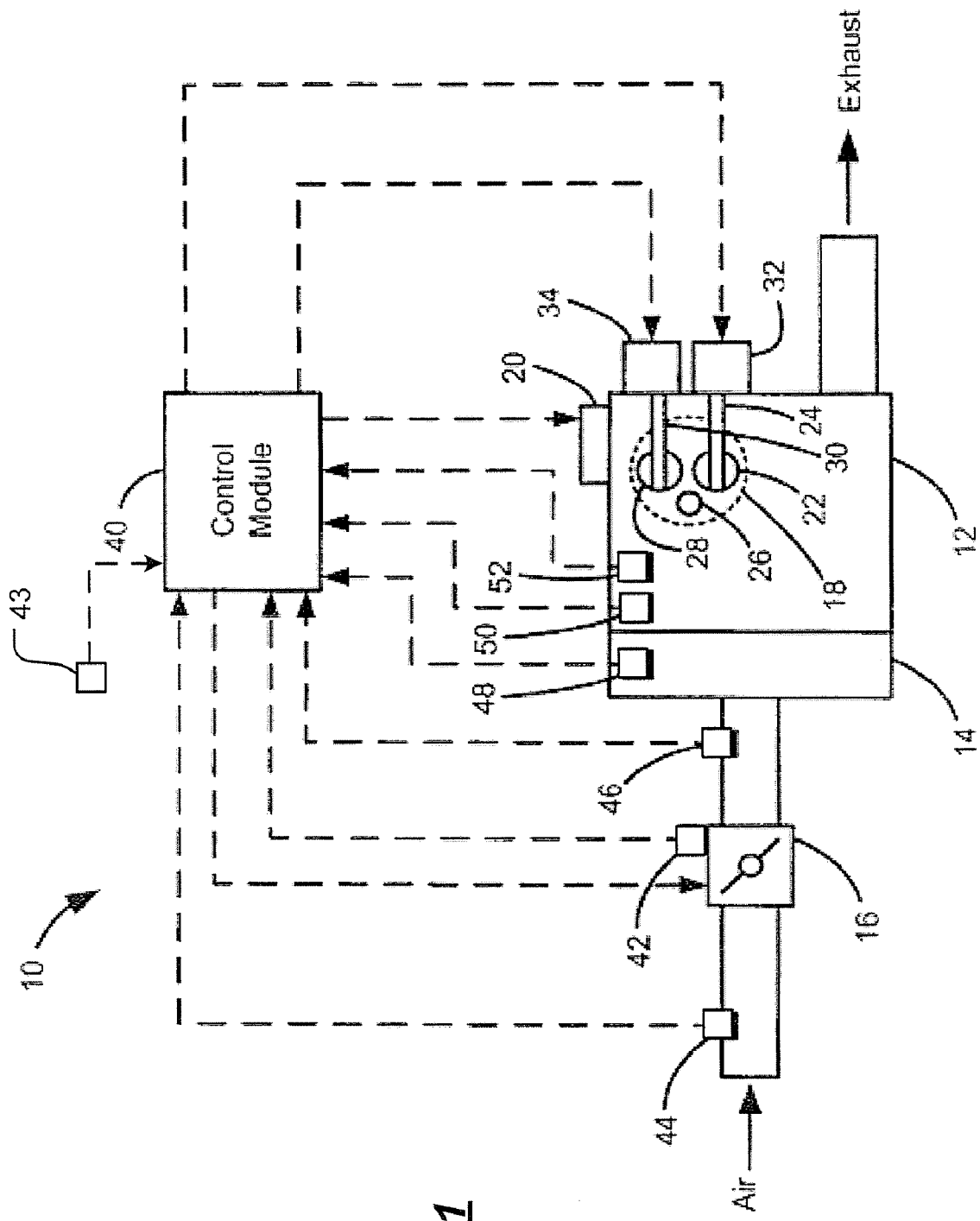
FIG. 1 is a functional block diagram of an engine control system that calculates residual gas fraction (RGF) according to the present disclosure.

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

RGF is described by an equation with manifold pressure, engine speed, atmospheric pressure, intake cam position, and exhaust cam position. The present disclosure provides an improved model for calculating RGF. The present disclosure tends to have a lower error relative to other models.

The residual gas fraction (RGF) may be represented using the following equations.

$$RGF = \frac{A(ICAM, ECAM, RPM)P_{baro}}{MAP}$$

$$B(ICAM, ECAM, RPM)A(ICAM, ECAM, RPM) =$$

$$a_0 + a_1 ICAM + a_2 ECAM + a_3 RPM + a_4 ICAM * ECAM +$$

$$a_5 ICAM * RPM + a_6 ECAM * RPM + a_7 ICAM^2 + a_8 ECAM^2 +$$

$$a_9 RPM^2 B(ICAM, ECAM, RPM) = b_0 + b_1 ICAM +$$

$$b_2 ECAM + b_3 RPM + b_4 ICAM * ECAM + b_5 ICAM * RPM +$$

$$b_6 ECAM * RPM + b_7 ICAM^2 + b_8 ECAM^2 + b_9 RPM^2$$

RGF is the summation of two equations (A and B). Both of these equations are functions of engine speed (RPM), intake cam position (ICAM) and exhaust cam position (ECAM). The A equation is multiplied by the ratio between barometric pressure ($P_{baro}$) and manifold pressure (MAP) to compensate for changes in altitude. The B equation is added to the A equation to obtain RGF.

Both the first and second equations contain calibration parameters. These calibration parameters are the "a" values in the A equation and "b" values in the B equation. The model may be calibrated by determining the actual residual gas fraction through a 1-D gas dynamics program and determining the calibration coefficients that minimize the error between the actual and modeled RGF.

A method that has been used to calculate residual gas fraction (known as the "MIT method) is described by the following equation.

$$x_r = C_1 \left(\frac{p_e}{p_i}\right)^{\frac{\gamma+1}{2\gamma}} \left(\frac{OF}{N}\right) \sqrt{\frac{p_e - p_i}{\rho_a}} + C_2 \left(\frac{p_e}{p_i}\right)^{\frac{1}{\gamma}} \frac{\Phi}{r_c}$$

where each of the variables are defined in SAE 931025, which is hereby incorporated by reference. This paper describes a method to estimate residual gas using a static formula based on engine constants (such as valve overlap) and two empirically derived constants. In practice, this model does not have sufficient accuracy.

Referring now to FIG. 1, an exemplary engine system 10 with intake and exhaust cam phasers is shown. The engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, the engine system 10 may be implemented in engines having a plurality of cylinders including, but not limited to, 2, 3, 4, 5, 6, 8, 10 and 12 cylinders.

A fuel injector (not shown) injects fuel that combines with the air as it is drawn into the cylinder 18 through an intake port. The fuel injector may be an injector associated with an electronic or mechanical fuel injection system 20. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out an exhaust port when an exhaust valve 28 is in an open position. The exhaust valve position is regulated by an exhaust cam shaft 30. The exhaust is treated in an exhaust system and is released to atmosphere. Although single intake and exhaust valves 22, 28 are illustrated, it is appreciated that the engine 12 can include multiple intake and exhaust valves 22, 28 per cylinder 18.

The engine system 10 further includes an intake cam phaser 32 and an exhaust cam phaser 34 that respectively regulate the rotational timing and/or lift of the intake and exhaust cam shafts 24, 30. More specifically, the timing of the intake and exhaust cam shafts 24, 30 can be retarded or advanced with respect to each other or with respect to a location of the piston within the cylinder 18 or crankshaft position. In this manner, the position of the intake and exhaust valves 22, 28 can be regulated with respect to each other or with respect to a location of the piston within the cylinder 18. By regulating the position of the intake valve 22 and the exhaust valve 28, the quantity of air/fuel mixture ingested into the cylinder 18 can be regulated. Additionally, the quantity of exhaust vented through the exhaust valve 28 can be regulated.

A control module 40 generates a throttle control signal based on a position of an accelerator pedal (not shown) and a throttle position signal generated by a throttle position sensor (TPS) 42. A throttle actuator adjusts the throttle position based on the throttle control signal. The throttle actuator can include a motor or a stepper motor, which provides limited and/or coarse control of the throttle position. The control module 40 also regulates the fuel injection system 20 and the cam shaft phasers 32, 34, as discussed in further detail below.

The barometric pressure $P_{baro}$ may be estimated or sensed. If sensed, a barometric pressure sensor 43 may be used to output a barometric pressure signal $P_{baro}$. The barometric pressure sensor 43 may be arranged in any suitable location. For example only, the barometric pressure sensor 43 may be arranged in the intake air system upstream from the throttle. The barometric pressure sensor 43 may generate the barometric pressure signal $P_{baro}$ during operation as the vehicle changes altitude.

An intake air temperature (IAT) sensor 44 is responsive to a temperature of the intake air flow and generates an intake air temperature signal. A mass airflow (MAF) sensor 46 is responsive to the mass of the intake air flow and generates a MAF signal. A manifold absolute pressure (MAP) sensor 48 is responsive to the pressure within the intake manifold 14 and generates a MAP signal. An engine coolant temperature sensor 50 is responsive to a coolant temperature and generates an engine temperature signal. An engine speed sensor 52 is responsive to a rotational speed of the engine 102 and generates in an engine speed signal. Each of the signals generated by the sensors is received by the control module 40.

The control module 40 may control the timing and/or energy of the spark plug ignition. The timing may be advanced or retarded relative to the position of piston within the cylinder 18 and relative to the positions of the intake valve 22 and/or the exhaust valve 28. The engine system 10 is merely exemplary in nature. For example only, the engine system 10 may include other sensors, forced induction using a turbocharger or supercharger, and/or other variations.

Figure 2A:
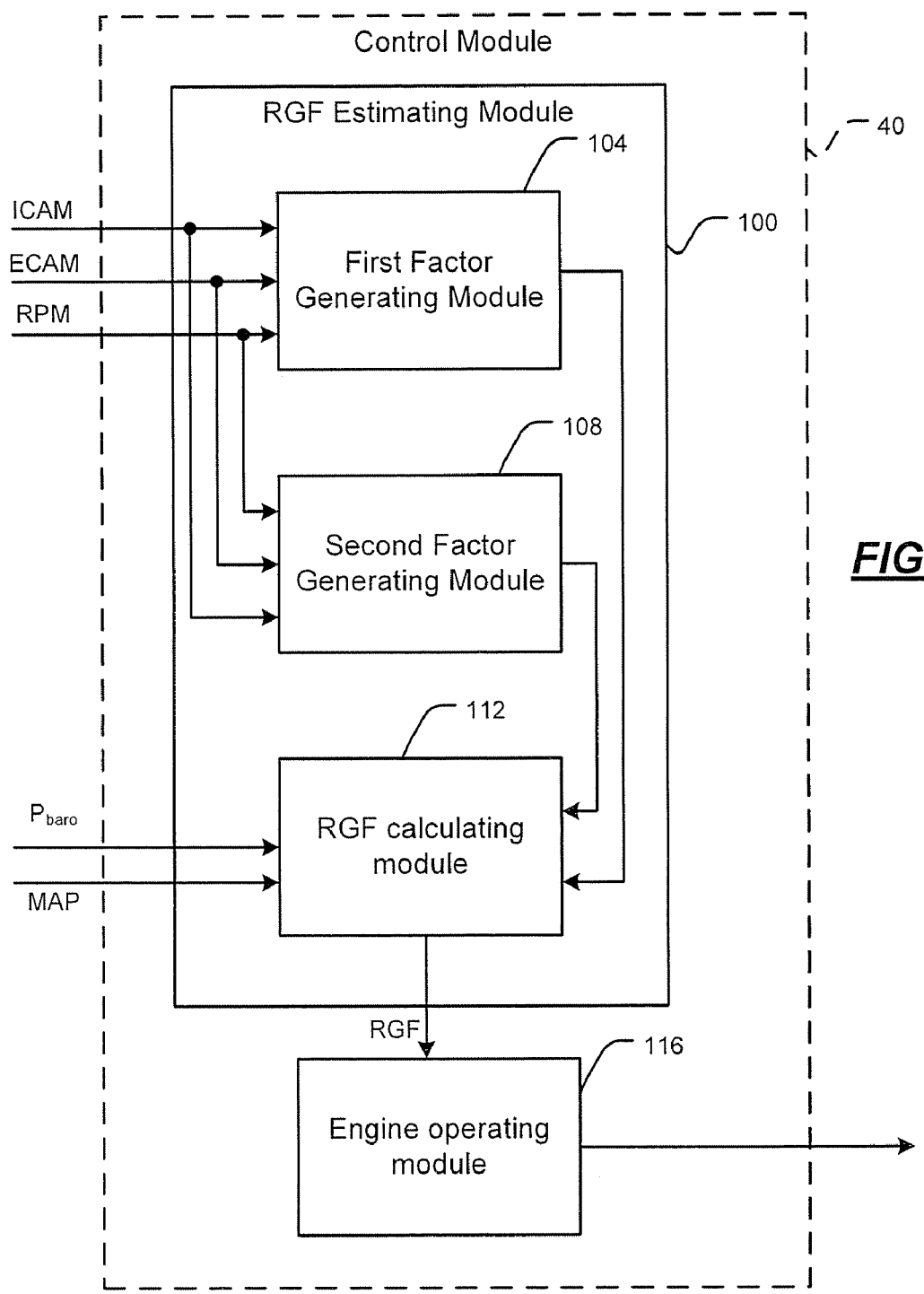
FIG. 2A illustrates an exemplary RGF estimating module.

Referring now to FIG. 2A, an exemplary RGF estimating module 100 is shown. The RGF estimating module 100 may include a first (or A) factor generating module 104, a second (or B) factor generating module 108 and a RGF calculating module 112. The first factor generating module 104 generates the A factor based on RPM, ICAM, ECAM and first calibration factors. The second factor generating module 108 generates the B factor based on RPM, ICAM, ECAM and second calibration factors. The RGF calculating module 112 calculates RGF based on $P_{baro}$, MAP and the A and B factors. The control module 40 may use the RGF estimate to modify another control value and/or adjust an engine operating parameter as described herein. For example only, the control module 40 may include an engine operating module 116 that adjusts an engine operating parameter such as fuel, throttle and/or engine speed based on the RGF estimate.

Figure 2B:
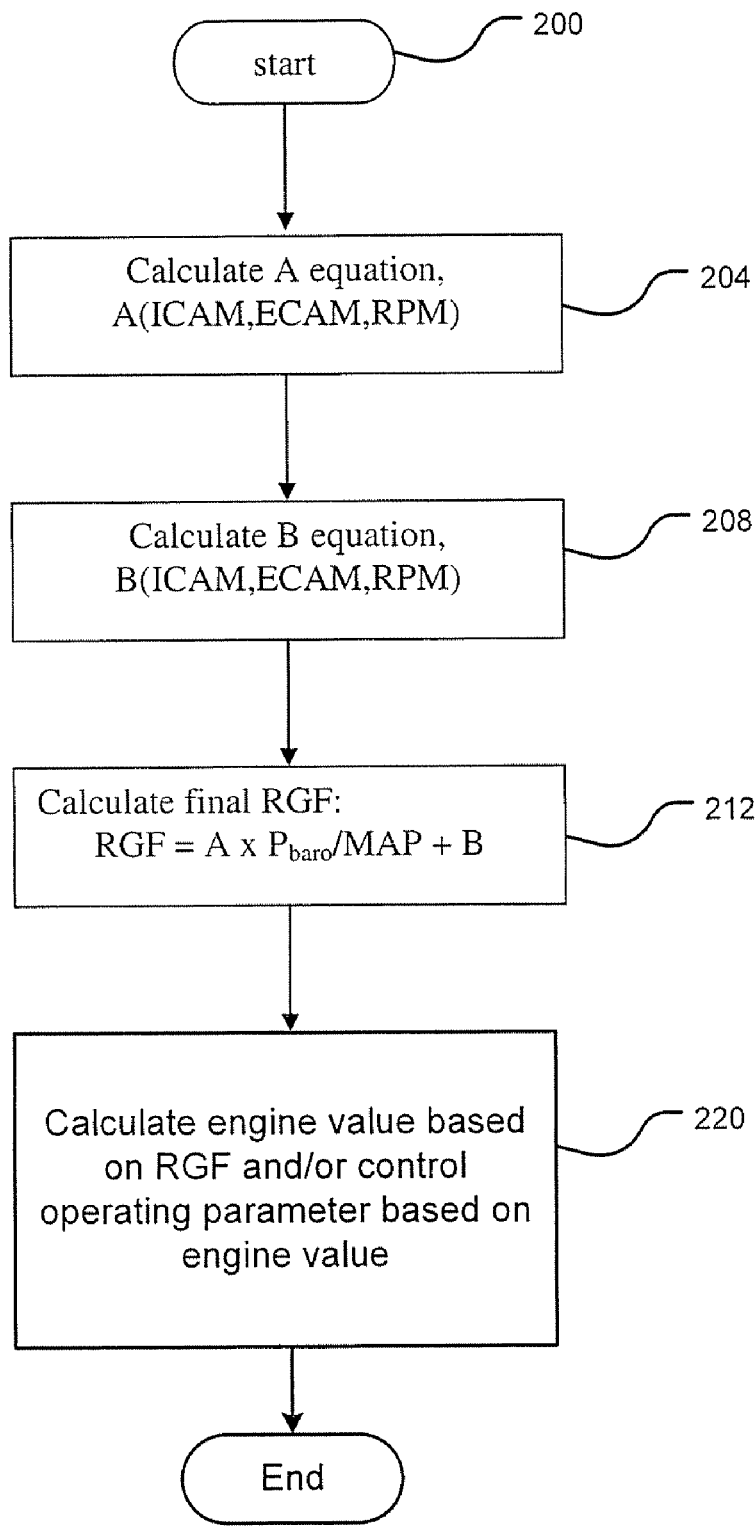
FIG. 2B illustrates steps of an exemplary method for calculating RGF and using RGF to control engine operation.

Referring now to FIG. 2B, processing steps used by the engine control module of an internal combustion engine to calculate residual gas fraction (RGF) according to the present disclosure are shown. Control begins with step 200. In step 204, control calculates the A equation or A(ICAM, ECAM, RPM). In step 208, control calculates the B equation or B(ICAM, ECAM, RPM). In step 212, RGF is calculated as a function of the A and B equations. Both of the A and B equations are functions of engine speed (RPM), intake cam position (ICAM) and exhaust cam position (ECAM). The A equation is multiplied by the ratio between barometric pressure ($P_{baro}$) and manifold pressure (MAP) to compensate for altitude changes. The B equation is added to the adjusted A equation to obtain RGF. In step 220, the RGF is used to calculate an engine operating value or adjust an engine operating parameter based on RGF. For example only, the RGF may be used to calculate at least one of charge mass, dilution, temperature and flame speed and/or to adjust at least one of engine idle speed, fuel and throttle.

Figure 3:
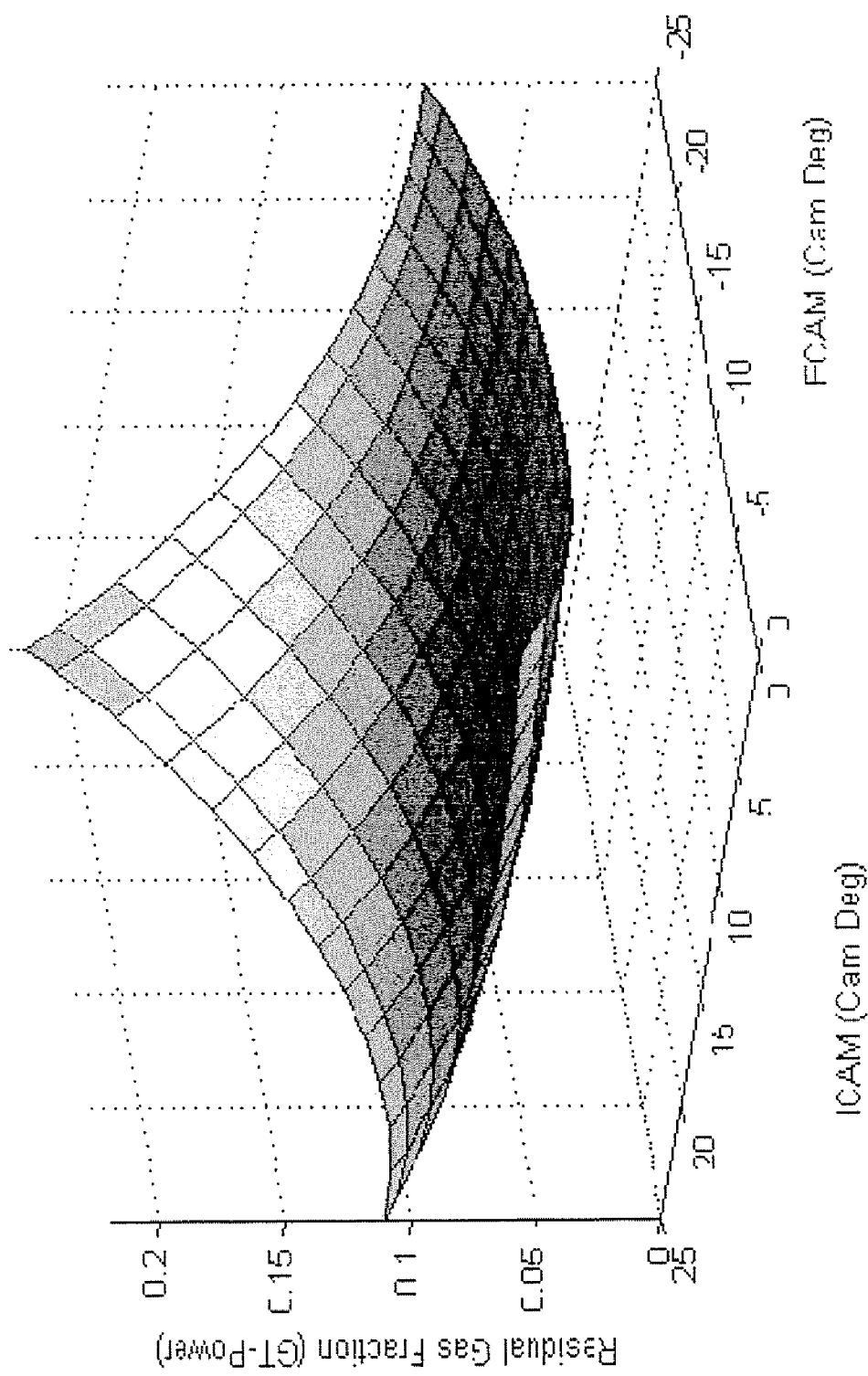
FIG. 3 is a graph of actual RGF based on intake and exhaust cam positions for an exemplary engine and operating point.
Figure 4:
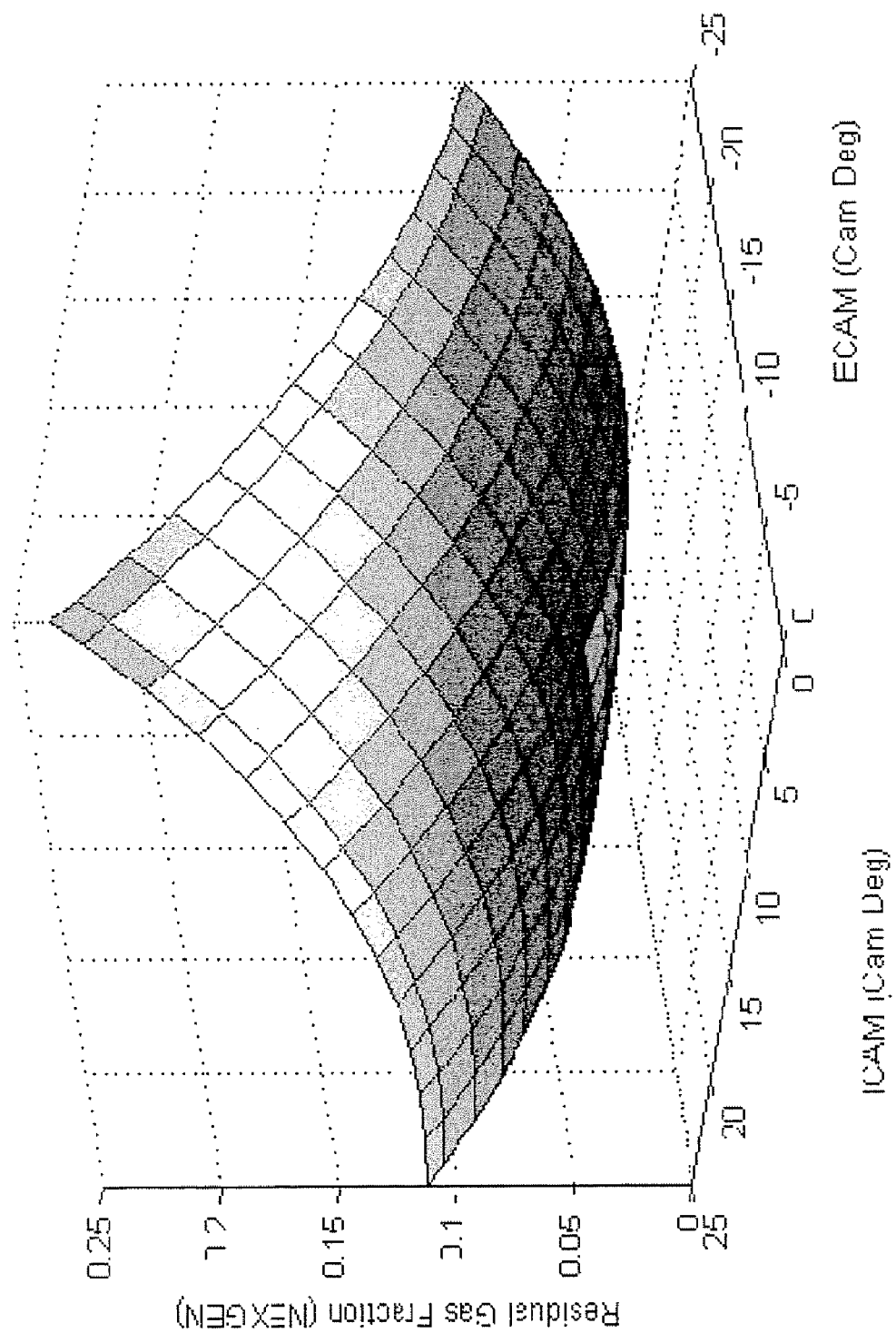
FIG. 4 is a graph of RGF modeled by the present disclosure for the exemplary engine and operating point of FIG. 3.
Figure 5:
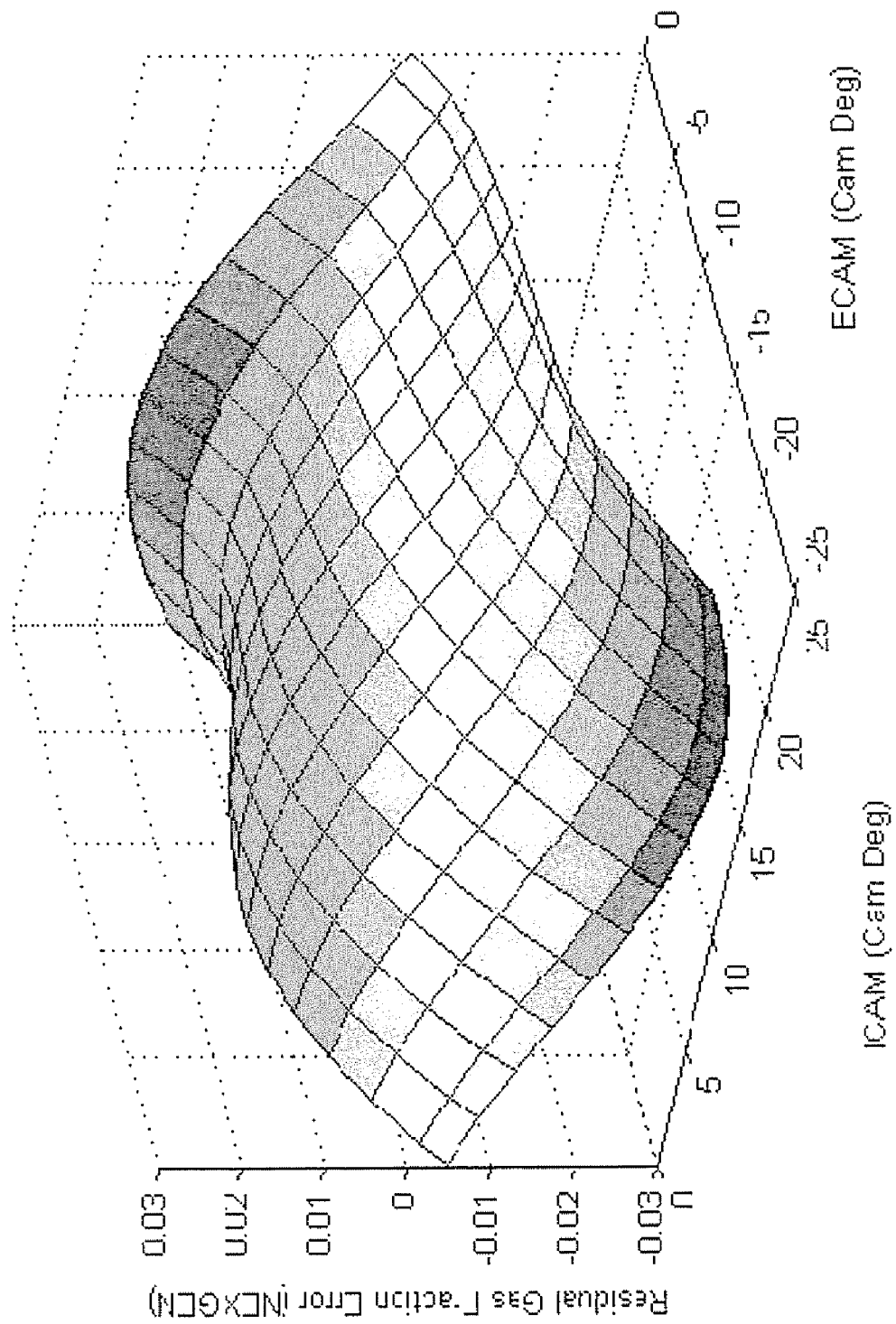
FIG. 5 is a graph of the error between the actual RGF and the RGF modeled by the present disclosure for the exemplary engine and operating point.

Referring now to FIGS. 3-5, the actual RGF for an exemplary internal combustion engine based on intake and exhaust cam positions is shown. In FIG. 4, the RGF modeled by the present disclosure is shown at the operating point of FIG. 3. In FIG. 5, the error between the actual RGF and the RGF modeled by the present disclosure is shown. The error may be expected to be less than 3% across the entire range of cam positions.

Figure 6:
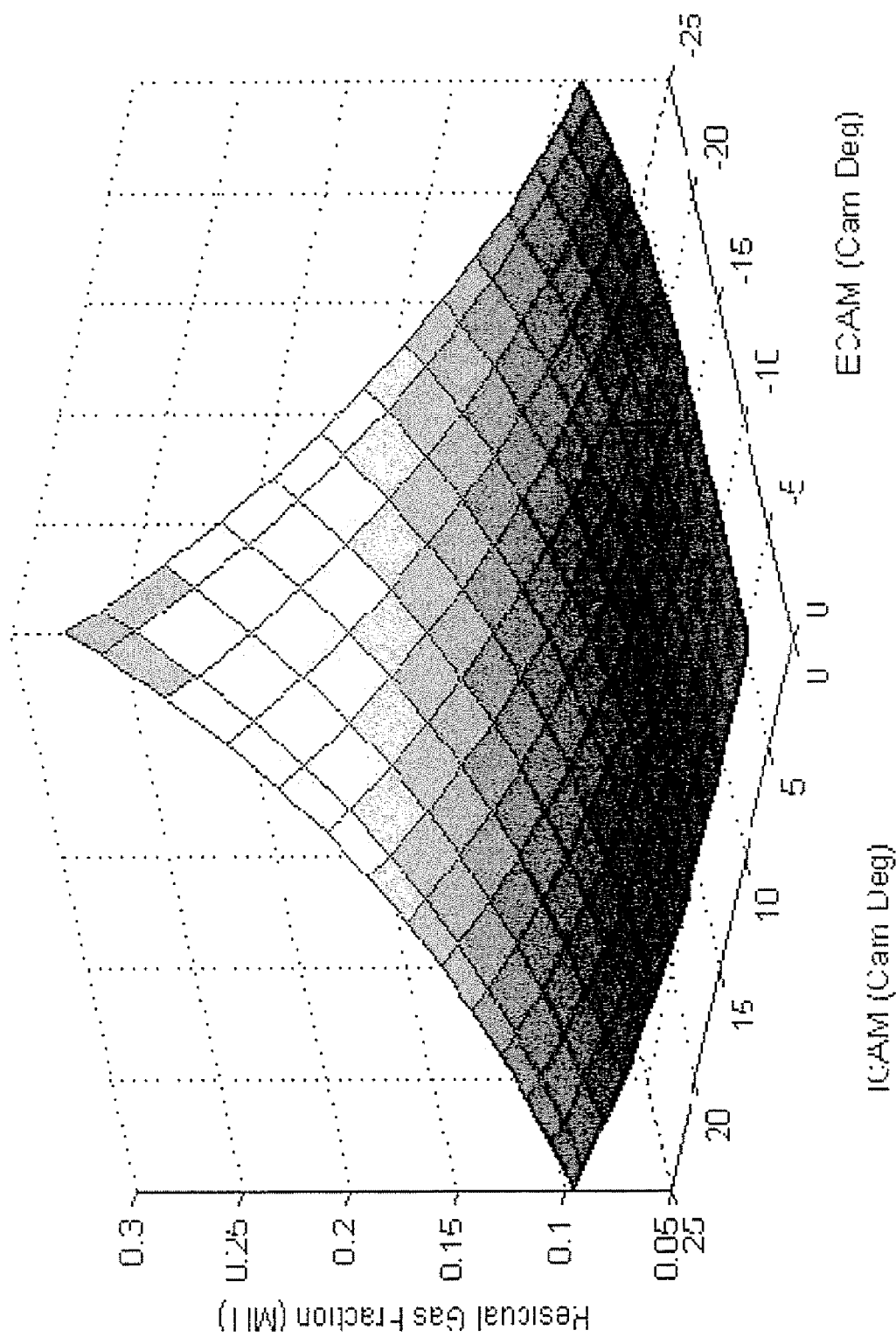
FIG. 6 is a graph of RGF modeled by an MIT model for the exemplary engine and operating point.

Referring now to FIG. 6, the RGF modeled by the MIT model at the same operating point is shown. This figure shows RGF modeled by the MIT model for the exemplary internal combustion engine at 4000 RPM and a manifold pressure of 61 kPa based on intake and exhaust cam positions.

Figure 7:
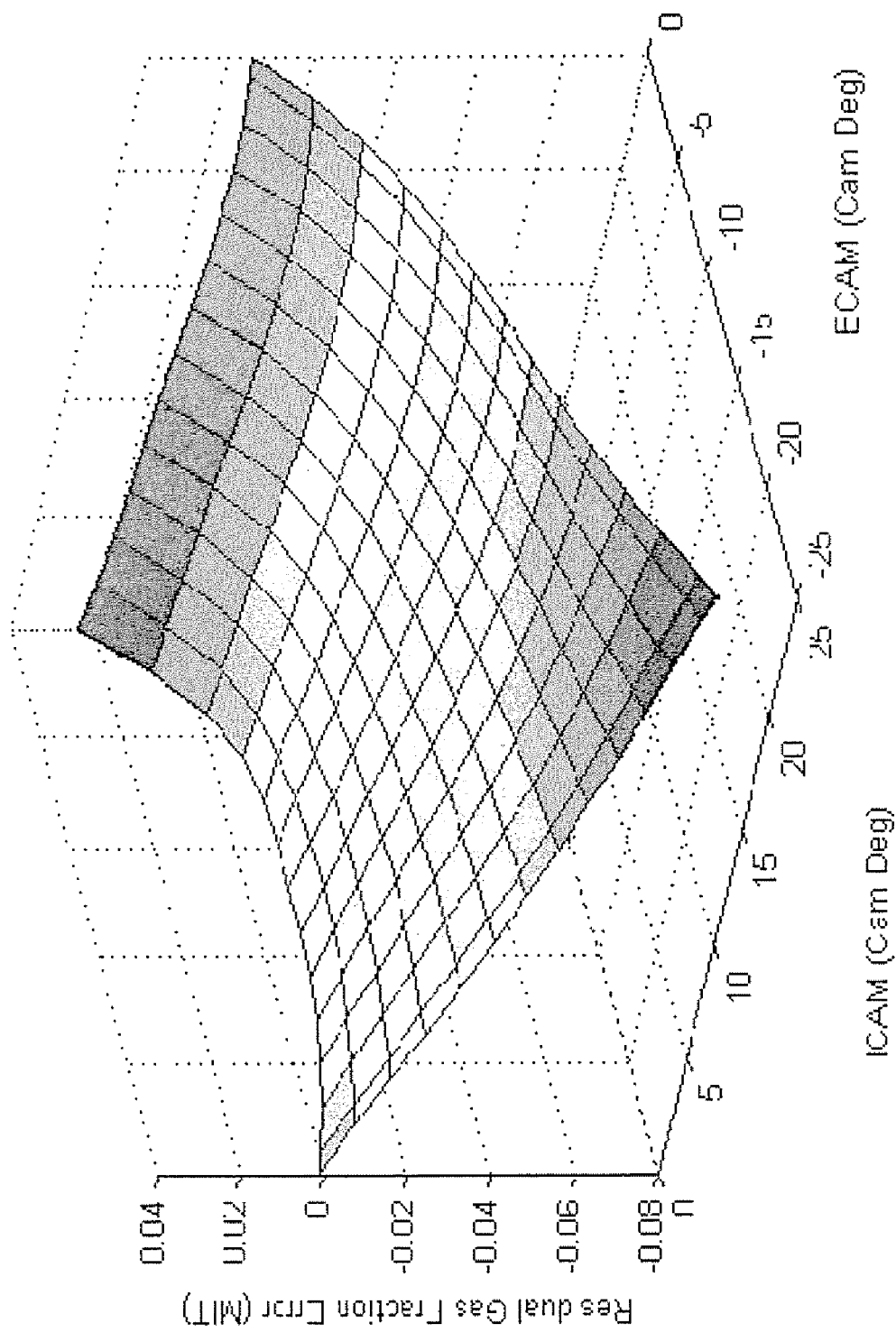
FIG. 7 is a graph of the error between the actual RGF and the RGF modeled by the present disclosure is shown.

Referring now to FIG. 7, the error between the actual RGF and the RGF modeled by the present disclosure is shown. The error may be expected to be as high as 7% at some combinations of cam positions.

Figure 8:
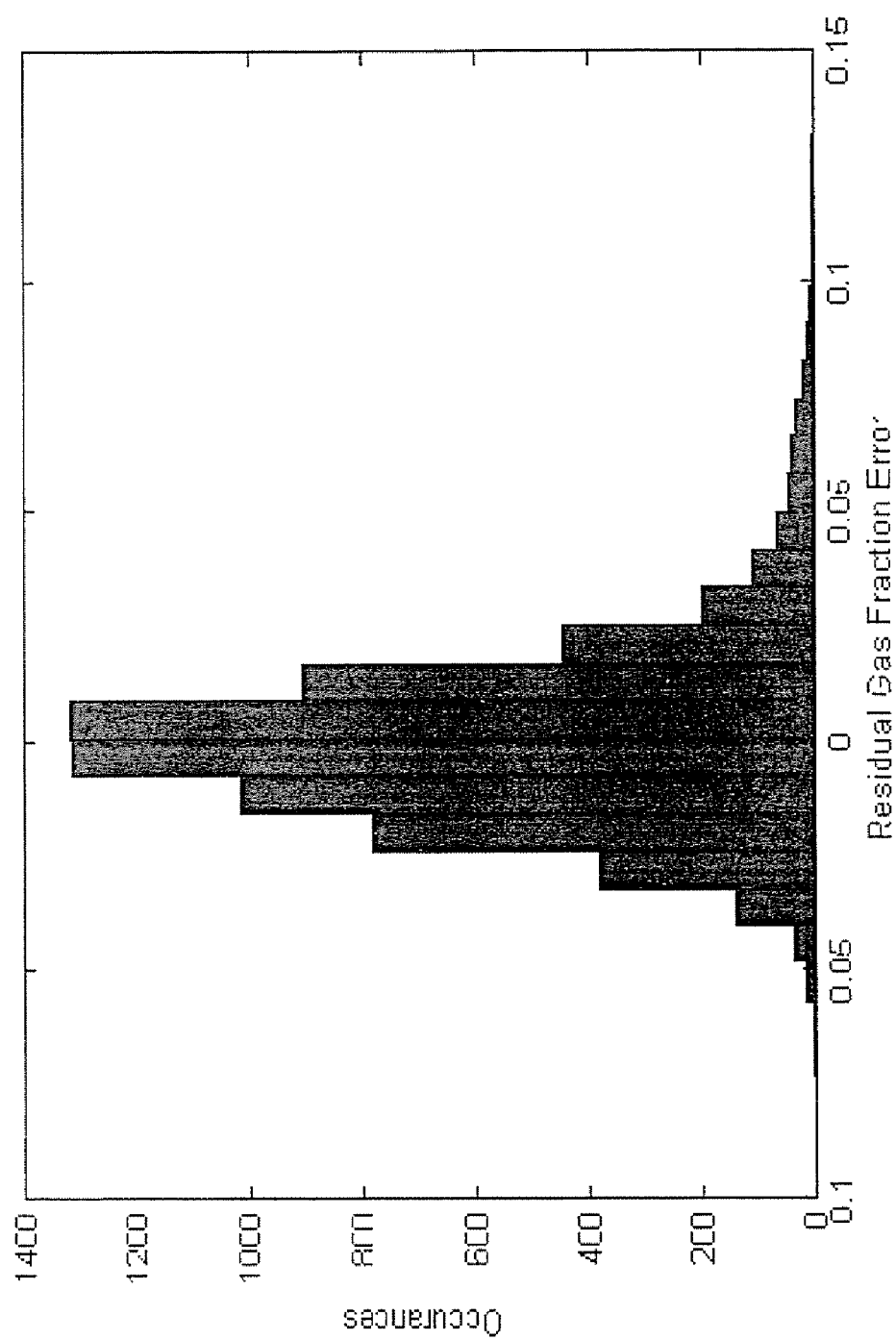
FIG. 8 is a histogram of errors between the true RGF and RGF modeled according to the present disclosure.

Referring now to FIG. 8, a histogram of the errors between the true RGF and RGF modeled according to the present disclosure is shown. The coefficients for the model were chosen to minimize the difference between true volumetric efficiency and modeled volumetric efficiency.

One of the benefits of the present disclosure is the ability to accurately predict RGF as altitude changes. FIG. 8 shows a distribution of the errors of the RGF calculated by the present disclosure at a barometric pressure of 99 kPa across the entire operating range of the engine in the engine speed, load, intake cam position and exhaust cam position dimensions.

Referring now to FIGS. 9-12, the error distribution of the RGF calculated by the present disclosure is shown across the operating range of the engine, but at different barometric pressures. In FIG. 9, RGF error is shown for 80 kPa without a barometric correction factor. In FIG. 10, RGF error is shown for 80 kPa with a barometric correction factor. The error at an atmospheric pressure of 80 kPa without the correction is large, and skewed to one side.

In FIG. 11, RGF error is shown for 60 kPa without a barometric correction factor. In FIG. 12, RGF error is shown for 60 kPa with a barometric correction factor. FIGS. 11 and 12 show the same story with an atmospheric pressure of 60 kPa.

RGF affects the combustion process in spark-ignition engines through its influence on charge mass, dilution, temperature and flame speed. These effects may be important for optimizing engine idle stability, fuel economy and NOx emission. Therefore, the control module of the present disclosure may use the improved RGF to calculate at least one of charge mass, dilution, temperature and flame speed to improve at least one of engine idle stability, fuel economy and NOx emission.

What is claimed is:

1. An engine control system, comprising:
a first factor calculating module that calculates a first factor based on intake cam position (ICAM), exhaust cam position (ECAM), engine speed (RPM) and first calibration factors;
a second factor calculating module that calculates a second factor based on ICAM, ECAM, RPM and second calibration factors;
a residual gas fraction (RGF) estimating module that estimates a RGF value based on said first factor adjusted for altitude and said second factor; and
an engine operating module that adjusts at least one engine operating parameter based on said RGF value.

2. The engine control system of claim 1 wherein said first factor calculating module calculates said first factor based on:

$$A(ICAM, ECAM, RPM) = a_0 + a_1 ICAM + a_2 ECAM + a_3 RPM + a_4 ICAM*ECAM + a_5 ICAM*RPM + a_6 ECAM*RPM + a_7 ICAM^2 + a_8 ECAM^2 + a_9 RPM^2$$

wherein $a_0, a_1, \ldots a_9$ are said first calibration factors.

3. The engine control system of claim 1 wherein said second factor calculating module calculates said second factor based on:

$$B(ICAM, ECAM, RPM) = b_0 + b_1 ICAM + b_2 ECAM + b_3 RPM + b_4 ICAM*ECAM + b_5 ICAM*RPM + b_6 ECAM*RPM + b_7 ICAM^2 + b_8 ECAM^2 + b_9 RPM^2$$

wherein $b_0, b_1, \ldots b_9$ are said second calibration factors.

4. The engine control system of claim 1 wherein said RGF estimating module estimates said RGF value based on $$RGF = \frac{A(ICAM, ECAM, RPM) P_{baro}}{MAP} + B(ICAM, ECAM, RPM)$$

wherein $P_{baro}$ is barometric pressure and MAP is manifold absolute pressure.

5. The engine control system of claim 1 wherein $P_{baro}$ is estimated.

6. The engine control system of claim 1 wherein $P_{baro}$ is periodically sensed during operation.

7. The engine control system of claim 1 wherein said engine operating module calculates at least one of charge mass, dilution, temperature and flame speed based on said RGF value.

8. The engine control system of claim 1 wherein said engine operating module adjusts at least one of engine idle speed, fuel and/or throttle based on said RGF value.

9. The method of claim 1 further comprising adjusting at least one of engine idle speed, fuel and/or throttle based on said RGF value.

10. A method comprising:
calculating a first factor based on intake cam position (ICAM), exhaust cam position (ECAM), engine speed (RPM) and first calibration factors;
calculating a second factor based on ICAM, ECAM, RPM and second calibration factors;
estimating a residual gas fraction (RGF) value based on said first factor adjusted for altitude and said second factors; and
adjusting at least one engine operating parameter based on said RGF value.

11. The method of claim 10 wherein said first factor is based on:

$$A(ICAM, ECAM, RPM) = a_0 + a_1 ICAM + a_2 ECAM + a_3 RPM + a_4 ICAM*ECAM + a_5 ICAM*RPM + a_6 ECAM*RPM + a_7 ICAM^2 + a_8 ECAM^2 + a_9 RPM^2$$

wherein $a_0, a_1, \ldots a_9$ are said first calibration factors.

12. The method of claim 10 wherein said second factor is based on:

$$B(ICAM, ECAM, RPM) = b_0 + b_1 ICAM + b_2 ECAM + b_3 RPM + b_4 ICAM*ECAM + b_5 ICAM*RPM + b_6 ECAM*RPM + b_7 ICAM^2 + b_8 ECAM^2 + b_9 RPM^2$$

wherein $b_0, b_1, \ldots b_9$ are said second calibration factors.

13. The method of claim 10 wherein said RGF value is based on $$RGF = \frac{A(ICAM, ECAM, RPM)P_{baro}}{MAP} + B(ICAM, ECAM, RPM)$$

wherein $P_{baro}$ is barometric pressure and MAP is manifold absolute pressure.

14. The method of claim 10 further comprising estimating $P_{baro}$.

15. The method of claim 10 further comprising periodically sensing $P_{baro}$ during operation.

16. The method of claim 10 wherein said engine operating module calculates at least one of charge mass, dilution, temperature and flame speed based on said RGF value.

* * * * *